July 24, 1956
H. F. DAVIS ET AL
2,756,376
REBALANCING MEASURING APPARATUS
Filed June 4, 1952
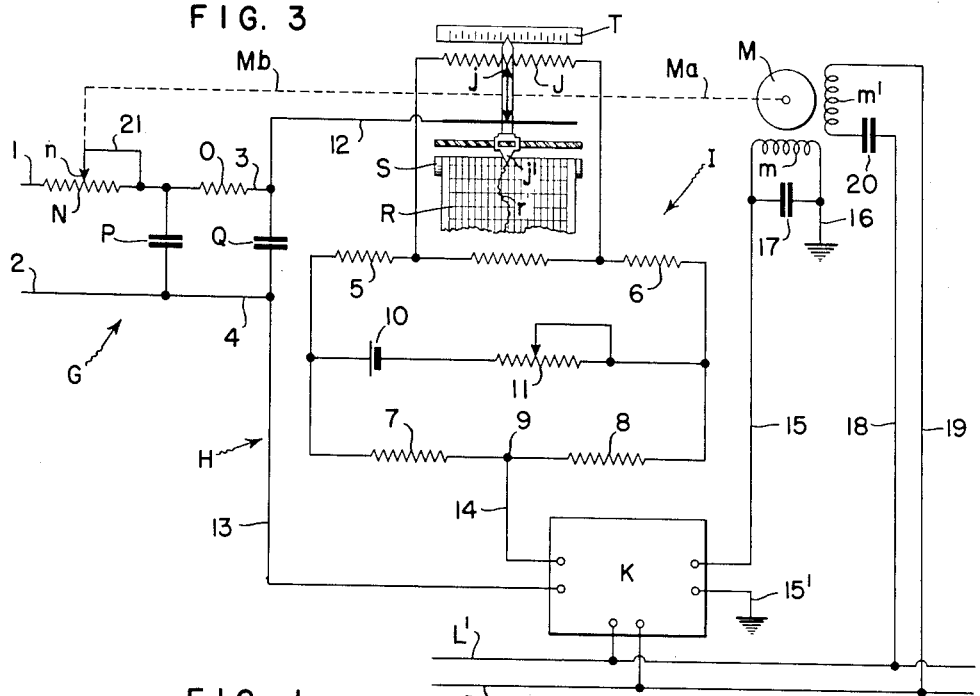
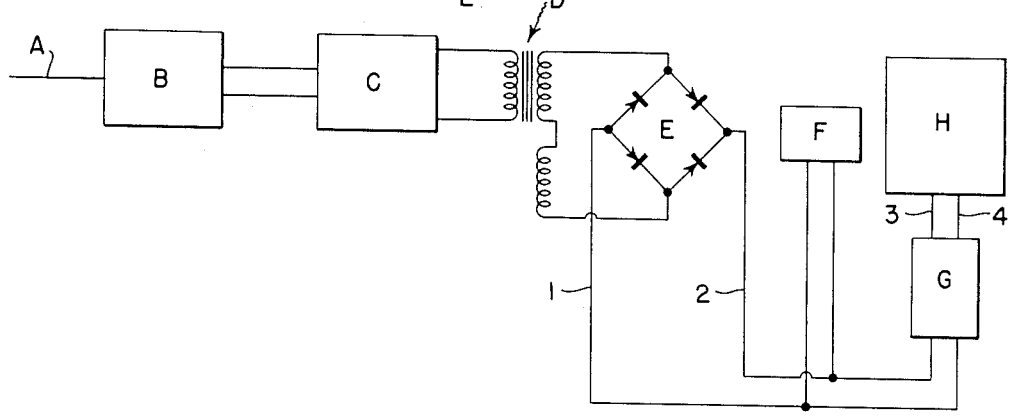
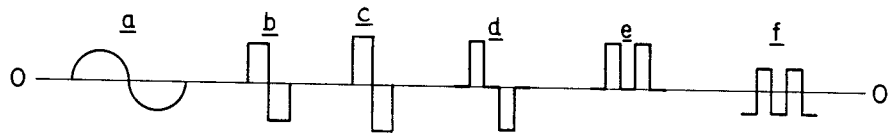
INVENTORS.
WILLIAM H. WANNAMAKER JR.
HENRY F. DAVIS
BY
Arthur H. Swanson
ATTORNEY.

United States Patent Office 2,756,376
Patented July 24, 1956

2,756,376

REBALANCING MEASURING APPARATUS

Henry F. Davis, Worcester, and William H. Wannamaker, Jr., Philadelphia, Pa., assignors to Minneapolis-Honeywell Regulator Company, Minneapolis, Minn., a corporation of Delaware Application June 4, 1952, Serial No. 291,726

2 Claims. (Cl. 318—29)

The present invention relates to telemetering apparatus of a well known commercial type comprising a transmitting section in which a measurable quantity is caused to create an alternating current signal varying in frequency with its magnitude. The frequency signal thus created is transmitted to the receiving section of the telemetering apparatus, ordinarily by modulating a carrier wave. At the receiving section the alternating current signal is converted into a square wave alternating current of an amplitude dependent on the frequency of the signal received, the square wave current is then converted into constant amplitude pulses of cycle width proportional to the frequency of the signal received. Those pulses are then rectified, and thereafter, the direct current formed by the rectified pulses is measured to provide a measure of the average value of said measurable quantity.

The general object of the present invention is to adapt rebalancing measuring apparatus of the well known and widely used type disclosed and claimed in the Wills Patent 2,423,540, of July 8, 1947, for use in accurately measuring the average value of the rectified pulses.

More specifically, the object of the invention is to provide a relatively simple and effective method of, and apparatus for, filtering the rectified pulses so as to form an average unidirectional current including a continuous current component of constant value, and a ripple which can be largely eliminated by suitable regulation of the filtering action.

To be adequately effective for its intended purpose, the filtering action must be adjusted or modified, as the signal to be measured varies in frequency. We have discovered that suitable regulation of the filtering action can be effected by varying the resistance of a portion of a filtering circuit of suitable character in proportion to changes in the average value of the rectified pulses. In the preferred form of the present invention, a rebalancing motor of the character disclosed in said Wills patent is used to adjust a wiper contact along a slide wire resistor included in a potentiometric measuring circuit, and is also used to simultaneously adjust a second contact along a second slide wire resistor included in the filtering circuit.

The various features of novelty which characterise our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 1 is a diagram illustrating the use of the present invention in connection with the receiving section of the telemetering apparatus;

Fig. 2 is a diagram illustrating successive changes in the form of the electrical signal transmitted to the receiver section from the transmitting section; and Fig. 3 is a circuit diagram illustrating the combination of self-balancing measuring and recording apparatus including a rebalancing motor with a filter circuit subject to adjustment by the rebalancing motor.

As diagrammatically shown in Fig. 1, A represents the path of the carrier wave modulated by an alternating current signal, which is of a frequency proportional to the magnitude of the volts, watts, vars, amperes or other power quantity measured in the unillustrated transmitting section of the telemetering apparatus. Said signal may be transmitted either by wire or as a radio wave to a remote channel receiver B. The modulated carrier wave signal passes from the channel receiver B to a filter and amplifier element C, and thence to a saturating transformer D. The secondary winding of the transformer D passes constant amplitude pulses, proportional in cycle width to the frequency of the pulses, to the input terminals of a rectifier E. The output terminals 1 and 2 of the rectifier E are connected to the input terminals of filtering apparatus G which has its output terminals 3 and 4 connected to the input terminals of self-balancing measuring apparatus H of the type disclosed in the previously mentioned Wills patent. As shown, a bias supply element F is connected across the conductors 1 and 2. The apparatus elements G and H comprise electrical circuits shown in detail in Fig. 3.

The known form of apparatus including the elements A, B, C, D, E and F, operates to modify a fluctuating signal received from the modulated carrier A by the channel receiver B, and successively modified by the elements B, C, D, E and F, before passing to the elements G and H. The output signal from the channel receiver B is of sinusoidal wave form, represented in Fig. 3 by the curve $a$. The output signal of the filter and amplifier element C is a square wave signal designated $b$ and $c$ in Fig. 2 and may be of variable amplitude as shown. The output signal from the saturating transformer D is in the form of pulses of constant amplitude represented in Fig. 2 by the curve $d$. The output signal of the rectifier E consists of rectified pulses represented in Fig. 2 by the curve $e$. The effect of the bias supply element F on the signal $e$ is to lower the signal potential 3 relative to the base line O—O, and is represented in Fig. 2 by the curve $f$.

In the particular arrangement shown, it is assumed that the immediate effect of the bias supply element F is to lower the potential of the signal impressed on the element H so that it causes the measuring apparatus to indicate zero when the actual signal frequency is 6 cycles per second. The bias element F thus serves as a suppressor to make the zero value of the signal measured correspond to the signal frequency at the low end of the measurable frequency range. Thus, when the measurable frequency range varies from a minimum of 6 C. P. S. to a maximum of 27 C. P. S., as is assumed herein, the zero value of the signal indicated by the measuring apparatus H indicates that the quantity measured has a frequency of 6 C. P. S.

As will be understood from the foregoing explanations, the apparatus consisting of the elements A, B, C, D, E and F, of Fig. 1, is not claimed as novel herein, but on the contrary, is a known combination of telemetering elements with which the measuring element H is combined in accordance with the present invention. The apparatus elements G and H, shown in block form in Fig. 1, are shown in electric circuit form in Fig. 1, wherein the output terminals 3 and 4 of the regulable filter G are connected to the measuring bridge circuit of the self-balancing measuring element H.

In the well known form of measuring apparatus H, illustrated in Fig. 3, the potentiometric bridge circuit I comprises one resistance branch including a slide wire resistor J interposed between resistors 5 and 6, and comprises a second resistance branch formed by resistors 7 and 8 connected end to end at the junction point 9. The two resistance branches of the circuit I are connected in parallel with one another and in series with an energizing circuit branch which includes a battery 10 and a variable resistor 11. A wiper contact j is in engagement with, and adjustable along the length of the slide wire resistor J, and is also continuously in engagement with a stationary conductor 12. The latter is thus continuously connected through the wiper contact j to the slide wire resistor J at the point engaged by the contact j. One end of the conductor 12 is connected to the filter terminal 3. The connected ends of the terminal 3 and conductor 12 are connected by a condenser Q to the connected ends of the filter terminal 4 and a conductor 13. The latter connects the terminal 4 and condenser Q to one input terminal of a voltage and motor drive amplifier K. The second input terminal of the amplifier K is connected by a conductor 14 to the bridge circuit point 9.

In the balanced condition of the bridge circuit, the potential difference between the filter terminals 3 and 4 is equal and opposite to the potential difference between the contact j and bridge circuit point 9, and the amplifier K is then quiescent. When the bridge circuit I is balanced, any change in the signal impressed on the input terminals 1 and 2 of the filter N will vary the potential difference between the wiper contact j and the bridge point 11 and thereby unbalances the measuring bridge. When the latter is unbalanced, current flows through the input circuit of the amplifier K and thereby energizes the motor M for operation to adjust the wiper contact j in the direction and to the extent required to rebalance the bridge circuit I and thereby interrupt the current flowing through the input circuit of the amplifier K.

The motor M is of the conventional type disclosed in the Wills patent and comprises a control winding m having one terminal connected to one output terminal 15 of the amplifier K. The second terminal of the winding m and amplifier K are connected to ground by conductors 16 and 15', respectively. The winding m is connected in parallel with a condenser 17 to form a parallel-resonant circuit. The motor M is provided with a power winding m' having its terminals 18 and 19 connected to alternating current supply conductors L' and L². The conductors L' and L² supply alternating current which may be of conventional voltage and frequency for example, 115 volts and 60 C. P. S. The terminal 18 includes a condenser 20 which cooperates with the winding m' to form a series-resonant circuit. The motor M comprises an operating shaft or element Ma which adjusts the contact j along the slide wire J in the direction and to the extent required to rebalance the bridge circuit I when the latter is unbalanced. The supply conductors L' and L² have branch connections to the amplifier K for energizing the latter.

The element N is a resistance capacitance integrating circuit comprising resistors N and O connected in series between the input and output terminals 1 and 3, input and output terminals 2 and 4 directly connected to one another, and also comprising a condenser P connected between the connected terminals 2 and 4 and the connected ends of the resistors N and O. A wiper contact n in engagement with and adjustable along the resistor N, is connected to the connected ends of the resistors N and O by a conductor 21, so that as the contact n is adjusted along the resistor N toward and away from the input terminal 1 of the element G, the resistance of the portion of the resistor N between the contact 1 the resistor O is decreased and increased, respectively. As shown, the wiper contact n is adjusted along the resistor N in the direction and to the extent which the wiper contact j is adjusted along the resistor J when the motor M is in rotation by a link or shaft connection Mb connecting the wiper contact n to the wiper contacts j.

A record of the varying values of the quantity measured by the telemetering apparatus is ordinarily recorded by recording mechanism actuated by the motor M. As diagrammatically shown, the recording mechanism comprises a marking element j' supported by the contact j. When the motor M adjusts the contact j along the slide wire J, the marking element j traces a record r on a record shown as a strip chart R. The latter is continuously advanced as by means of a roller S rotated by a constant speed motor, not shown, or other constant speed rotating mechanism.

For the purposes of the present invention, the resistors N and O may have resistances of 500 and 680 ohms, respectively, and the condensers P and Q may have capacities of 800 and 50 microfarads, respectively. In practice, the bridge circuit I and amplifier K are associated with switching mechanism and terminals and a standard cell, for varying the resistance 11 in series with the battery 10 as required to keep the output current of said battery substantially constant, notwithstanding the reduction in its voltages as the battery ages. Since such switching mechanism, terminals and standard cell arrangement is well known and forms no parts of the invention claimed herein they need not be further described.

The use of square wave D. C. pulse signals at some variable time rate is common in telemetering work, and such signals may be produced by other apparatus than that shown diagrammatically in Fig. 1. In adapting a known recorder of the type illustrated and described herein, for operation in response to such signals, a resistance-capacitance integrating circuit is essential for measuring the average value of such a signal. A proper time constant, suitable for any one set of closely related input frequency values, may be readily provided but will be quite inadequate for widely differing input frequency values. For example, an arrangement which will give suitably accurate measurements at the top of the measuring instrument scale will not adequately average the lower frequency measurements made at the lower end of the scale. By coupling a filter regulating a rheostat included in the resistance-capacitance integrating circuit to the wiper contact engaging the measuring circuit slide wire, as described above, we are able to obtain a variable time constant circuit adapted to give the fastest practical responses in measuring with adequate accuracy the average values of signals obtained at substantially differing frequencies.

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. Electrical measuring apparatus comprising a pair of input terminals adapted for connection to a source of unidirectional signal pulses of varying frequency, a signal averaging circuit including a rheostat having an adjustable slider and a condenser connected thereto and having its end terminals forming output terminals for said averaging circuit, said condenser having an output direct current potential thereon proportional to the frequency of the input pulses, a self-balancing potentiometric apparatus having input terminals connected to the output terminals of said averaging circuit, said potentiometric apparatus including a balancing slidewire resistor having an adjustable slider and motor means connected to be controlled in accordance with the state of balance of said potentiometric apparatus and connected to adjust said slider on said balancing slidewire resistor, and means connecting said motor means to the adjustable slider of said rheostat to vary the averaging effect of said averaging circuit with changes in frequency of the unidirectional pulses.

2. Electrical measuring apparatus comprising a pair of input terminals adapted for connection to a source of unidirectional signal pulses of varying frequency, a first signal averaging circuit comprising a rheostat having an adjustable slider and a condenser connected in series to said input terminals, a second signal averaging circuit comprising a resistor and a second condenser connected in series to said first named condenser, said second condenser having a direct current potential thereon proportional to the frequency of the input signal pulses, a direct current self-balancing measuring apparatus having a pair of input terminals connected across said second condenser, said apparatus including a balancing slidewire resistor, an adjustable slider for said slidewire resistor, and motor means connected to said slider to adjust said slider to balance said measuring apparatus, and means including said motor means connected to the slider of said rheostat to adjust said slider simultaneously with the adjustment of the slider of said balancing slidewire resistor to vary the averaging effect of said first signal averaging circuit as the frequency of the input signal pulses varies.

References Cited in the file of this patent

UNITED STATES PATENTS

| | | |
|---|---|---|
| Re. 23,121 | Harrison | June 14, 1949 |
| 1,897,767 | Roberts | Feb. 14, 1933 |
| 2,040,955 | Roberts | May 19, 1936 |
| 2,088,229 | Braden | July 27, 1937 |
| 2,160,088 | Runge | May 30, 1939 |
| 2,192,022 | Wills | Feb. 27, 1940 |
| 2,470,443 | Mittelman | May 17, 1949 |
| 2,523,791 | Vahle et al. | Sept. 26, 1950 |
| 2,611,030 | Sontheimer | Sept. 16, 1952 |